(12) United States Patent
Rhodes et al.

(10) Patent No.: US 8,364,079 B2
(45) Date of Patent: *Jan. 29, 2013

(54) COMMUNICATION THROUGH A BARRIER

(75) Inventors: Mark Rhodes, West Lothian (GB);
Brendan Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,103

(22) Filed: Apr. 6, 2012

(65) Prior Publication Data

US 2012/0196533 A1    Aug. 2, 2012

Related U.S. Application Data

(63) Continuation of application No. 12/335,658, filed on Dec. 16, 2008, now Pat. No. 8,175,526.

(60) Provisional application No. 61/014,758, filed on Dec. 19, 2007.

(30) Foreign Application Priority Data

Dec. 19, 2007  (GB) .................................. 0724392.6

(51) Int. Cl.
*H04B 5/00*  (2006.01)

(52) U.S. Cl. ....................................... 455/41.1; 323/355

(58) Field of Classification Search ................. 455/41.1; 323/355, 363

See application file for complete search history.

(56) References Cited

U.S. PATENT DOCUMENTS

| | | | |
|---|---|---|---|
| 3,310,736 A | 10/1963 | Bayly et al. | 324/62 |
| 4,454,815 A | 6/1984 | Beck | 102/206 |
| 4,985,922 A | 1/1991 | Kolbert | 380/59 |
| 5,480,415 A * | 1/1996 | Cox et al. | 607/32 |
| 7,295,878 B1 * | 11/2007 | Meadows et al. | 607/61 |
| 7,444,184 B2 * | 10/2008 | Boveja et al. | 607/40 |
| 8,175,526 B2 * | 5/2012 | Rhodes et al. | 455/41.1 |
| 2002/0177884 A1 * | 11/2002 | Ahn et al. | 607/61 |
| 2005/0288742 A1 * | 12/2005 | Giordano et al. | 607/61 |

FOREIGN PATENT DOCUMENTS

| | | |
|---|---|---|
| EP | 1592142 | 11/2005 |
| GB | 0499037 | 7/1938 |
| WO | 2006/134331 | 12/2006 |
| WO | 2008/039676 | 4/2008 |

* cited by examiner

*Primary Examiner* — Brian Young
(74) *Attorney, Agent, or Firm* — Paul Davis; Goodwin Procter LLP

(57) ABSTRACT

A magnetic flux coupling transducer system comprising a primary coil (51) and primary coupling core (52) and a secondary coil (54) and secondary coupling core (55) for passing communications signals and/or electrical power from one side of an electrically conductive barrier to receiving equipment on the other side.

21 Claims, 6 Drawing Sheets

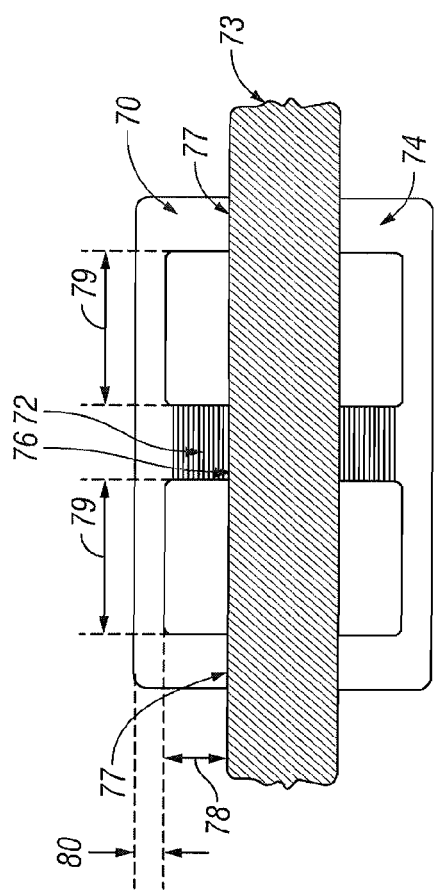
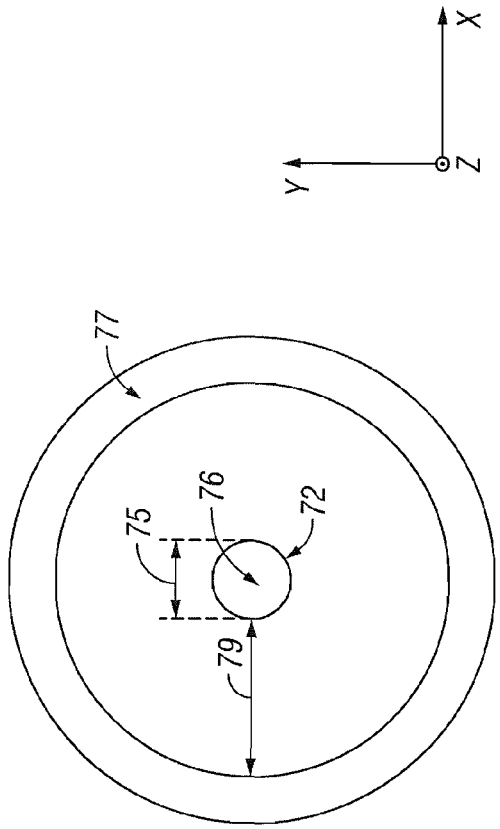
FIG. 3A
FIG. 3B

COMMUNICATION THROUGH A BARRIER

CROSS-REFERENCE TO RELATED APPLICATIONS

This application is a continuation of U.S. application Ser. No. 12/335,658 filed Dec. 16, 2008 now U.S. Pat. No. 8,175,526, which claims the benefit of U.S. Ser. No. 61/014,758 filed Dec. 19, 2007 and GB 0724392.6 filed Dec. 14, 2007, all of which applications are fully incorporated herein by reference.

INTRODUCTION

The present invention relates to a system, which achieves transmission of a communications channel through a barrier. This system also effectively delivers electrical power through the barrier.

BACKGROUND

Metal structures are common throughout industry due to their ease of construction, strength and mechanical integrity. A common problem is faced when attempting to communicate data across the body of a metal structure. A hole can readily be drilled to pass through an electrically conductive or optical fibre communications cable, but this results in a weakening of the otherwise continuous metal barrier and introduces an area, which is often prone to failure. In extreme applications, such as the metal pressure hull of a submerged vehicle, failure of such a through hole penetration can have serious operational consequences. There is a need for a system that can effectively extend communications and power distribution in to areas bounded by a metal barrier without the need to modify the barrier.

SUMMARY OF INVENTION

According to one aspect of the present invention, there is provided a system for communicating data and/or transferring electrical power from one side of a barrier, of high magnetic permeability, to receiving equipment on the other side. Data is represented by modulation of a high power current waveform, which passes through a multi-turn coil of electrically conducting wire, wound around a high permeability-coupling core to increase the generation of magnetic flux. The modulated current produces a varying magnetic flux in the coupling core, which is positioned in close contact with the metallic barrier. Magnetic flux acts to complete a magnetic circuit and part of the flux finds a return path through the barrier. A second similar coupling core is located on the other side of the metal barrier. The magnetic reluctance of the second coupling core is arranged to be sufficiently low compared to that of the alternative path between coupling poles directly through the barrier to ensure a proportion of the magnetic flux flows through the secondary coupling core. The modulated magnetic flux passing through the secondary coupling core induces a voltage across a secondary coil. This voltage delivers a modulated communications channel and/or power to equipment located at the far side of the conductive barrier.

By using magnetic flux to communicate and/or deliver electrical power through a barrier, for example a barrier, with a magnetic relative permeability of greater than 10, the structure can maintain its integrity so removing the need for barrier penetration or any modification of the barrier.

According to another aspect of the present invention, there is provided a method for efficient installation of the two communicating transducers based on maximisation of received signal. During assembly two-dimensional positioning can be optimised by experimentally plotting received signal strength variation with position and relative rotation. Using this method the second transducer of the pair can be positioned for maximum transfer efficiency based on received signal strength.

Various aspects of the invention are defined in the independent claims. Some preferred features are defined in the dependent claims.

BRIEF DESCRIPTION OF THE DRAWINGS

Various aspects of the invention will now be described by way of example only and with reference to the accompanying drawings, of which:

FIG. 3 illustrates an alternative co-axial mechanical implementation of the coupling device;

DETAILED DESCRIPTION OF THE DRAWINGS

The present invention relates to a coupling transducer system that achieves signal transfer from primary coil to secondary but is designed around an intermediate conductive barrier. The barrier forms an additional path for magnetic flux, which is undesired in conventional transformer design since this leakage flux path does not intersect the secondary coil. This presents a design challenge to ensure sufficient magnetic flux passes through the coupling core to allow linkage of communications signals through the barrier.

A barrier composed of material with a relative magnetic permeability of greater than 10 will benefit from the design features described here.

Magnetic flux reluctance represents the relative impediment to the flow of magnetic flux. The reluctance of the magnetic circuit completed by the barrier relative to that of the secondary coupling core will determine the relative flow of flux. Magnetic reluctance is inversely proportional to cross sectional area and magnetic permeability while proportional to path length following the equation defined below:

$$R = \frac{l}{\mu_0 \mu_r A} \qquad \text{equation 1}$$

where:
R is the magnetic reluctance in 1/Henry l is the length of the circuit in meters
$\mu_0$ is the permeability of free space
$\mu_r$ is the relative magnetic permeability of the material (dimensionless)
A is the cross-sectional area of the circuit in square meters Magnetic flux reluctance decreases as the cross sectional area of the coupling cores, orthogonal to the flux vector, increases.

Figure 1:
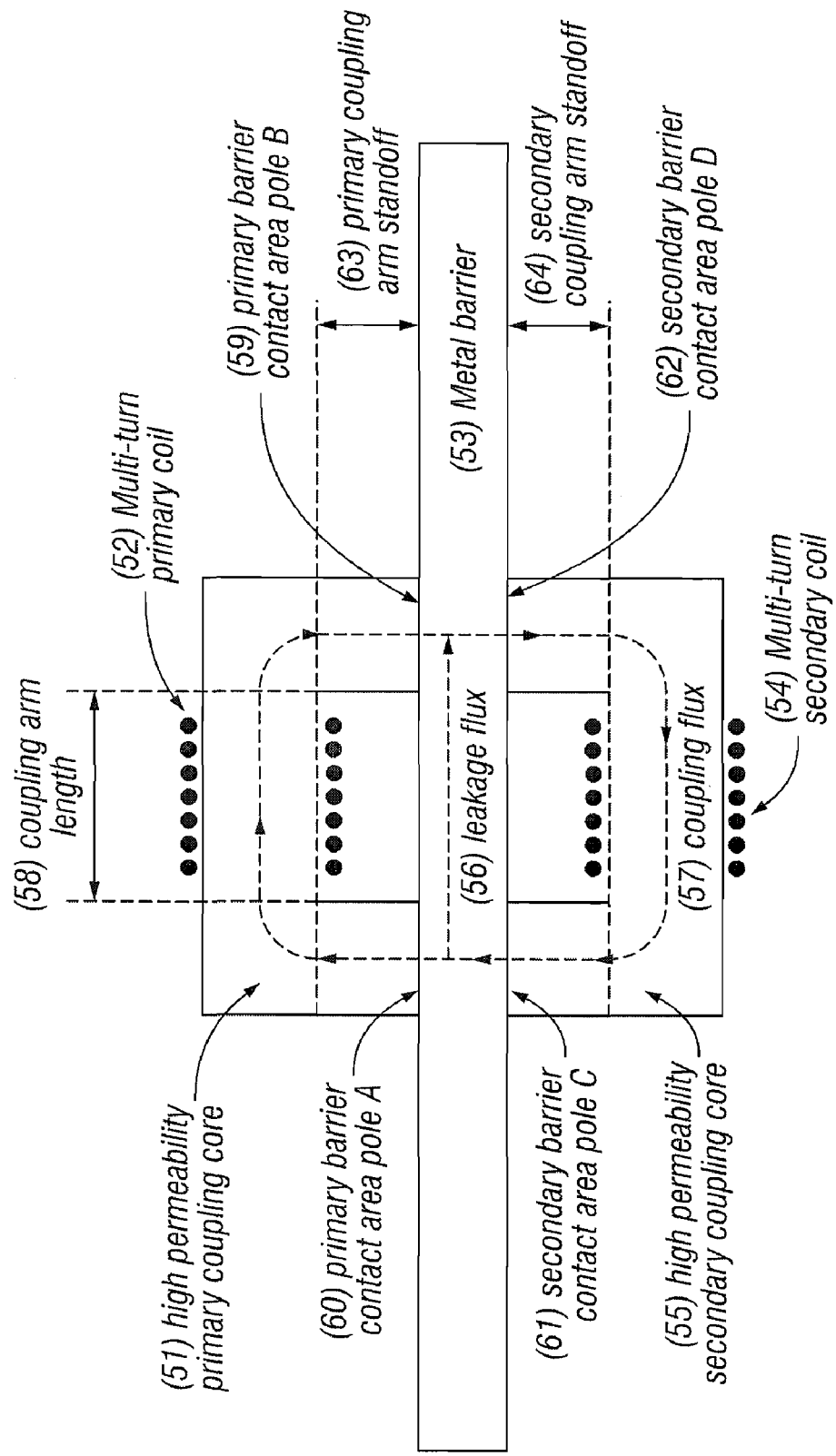
FIG. 1 shows a cross sectional drawing of a U-shaped coupling transducer system deployed on either side of a metal barrier.

FIG. 1 shows a cross sectional drawing of a U-shaped coupling transducer system deployed on either side of a metal barrier. Primary 51 and secondary 55 coupling cores are formed in a U-shaped cross section and positioned on opposite sides of a barrier. A modulated alternating carrier current passes through multi-turn primary coil 52. This current induces magnetic flux in a high permeability primary coupling core 51. The relative magnetic permeability of the primary coupling core 51 must be greater than 100 to ensure efficient generation of magnetic flux. Coupling core 51 is in close contact with the high permeability continuous metal barrier 53. Magnetic flux 57 circulates through primary coupling core 51, passes through the high permeability barrier 53 and into the secondary coupling core 55. Flux flowing through the secondary coupling core induces a voltage across the secondary coil 54, which delivers a modulated communications channel and power to equipment located at the far side of the high magnetic permeability barrier. 60 shows "pole" area A of the primary coupling arm that is in contact with the barrier surface while 59 shows pole B on the other end of the primary coupling arm that is in contact with the barrier surface. 61 shows pole C of the secondary coupling arm that is in contact with the barrier surface while 62 shows pole D on the other end of the secondary coupling arm that is in contact with the barrier surface. Pole A is preferably arranged to be aligned with pole C on the other side of the barrier and pole D is arranged to be aligned with pole B. Poles 59 and 60 should be machined to be substantially planar with respect to each other to provide good contact with the flat surface of a barrier. Poles 61 and 62 should be machined to be substantially planar with respect to each other to provide good contact with the flat surface of a barrier.

Dimension 58 represents the distance between the coupling arm contact points with the barrier. As dimension 58 is increased the magnetic reluctance of the leakage path 56 increases due to the increased path length while the barrier thickness and the reluctance of coupling path between coupling transducers A-C and B-D remains constant. Increasing the length 58 of the U-shaped coupling transducers is beneficial and will be constrained by practical considerations relating to the overall dimensions of the devices. Dimension 58 should be greater than the barrier thickness.

Dimension 63 represents the stand off distance of the primary coupling arm from the barrier while 64 represents the corresponding feature on the secondary coupling arm. Dimensions 63 and 64 should be minimised while allowing for the thickness of coils 52 and 54 which must enclose the coupling arm passing between the coupling arm and the barrier as illustrated. This will minimise the coupling arm magnetic reluctance.

Coupling arm length 58, primary standoff 63, secondary standoff 64, core relative permeability and core cross sectional area should be designed following equation 1 to ensure the magnetic reluctance of the secondary coupling arm is less than 100 times greater than the reluctance of barrier leakage path 56. The requirement for alignment of both poles either side of the barrier will typically result in the two coupling arm assemblies being constructed of similar dimensions.

A typical metallic barrier will have an electrical conductivity greater than 1000 S/m and magnetic relative permeability of greater than 10.

Figure 2:
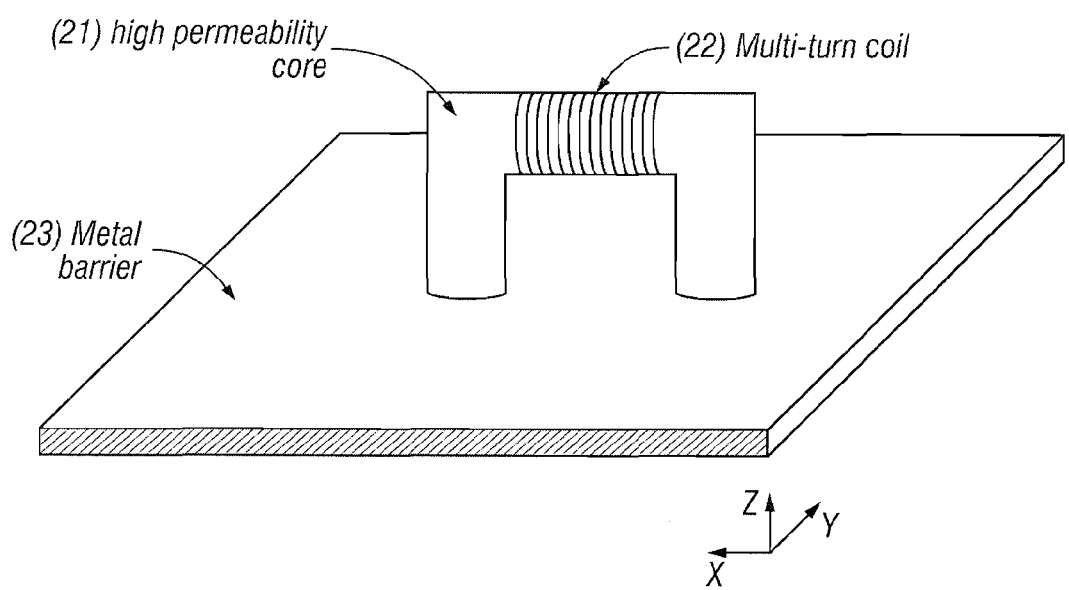
FIG. 2 gives a perspective representation of one side of the same equipment.

FIG. 2 gives a perspective representation of the same equipment to illustrate the multi-turn windings 22. Multi-turn coil 22 is wound round the high permeability coupling core 21, which is in close physical contact with the metal barrier 23. While the metal barrier is represented here with relatively small dimensions the barrier will typically be much larger than shown in the X-Y dimensions illustrated in the drawing. This drawing defines the X-Y-Z co-ordinates referenced throughout this text.

FIG. 3 illustrates an alternative co-axial mechanical implementation of the coupling apparatus. In this arrangement the coupling apparatus poles are implemented as a central core 76 co-axially surrounded by circular structure 77. Primary coupling arm 70 is arranged to be aligned with secondary arm 74 on the opposite side of barrier 73. Surfaces 76 and 77 will be machined to be substantially co-planar to maximise contact with a flat barrier surface. This arrangement removes the need for rotational alignment between the two coupling assemblies on either side of the barrier at installation. Surfaces 77 and 76 are held in contact with the metal barrier and are formed using high permeability material. Primary coil 72 is wound round the inner core 76 to efficiently generate magnetic flux within the core.

Drawing 3A represents a cross-sectional view. Drawing 3B represents an end view of the face, which contacts the barrier. 3B represents a view of the X-Y plane and 3A shows a cross section through the centre of the device in the XZ plane. It will be beneficial to increase the separation of the coupling poles in the same way that dimension 58 is increased in the U-shaped design. In this co-axial design the radius distance 79 separating the centre pole 76 and the surrounding pole 77 should be maximised within practical dimensional constraints.

FIG. 3 is not drawn to scale and diameter 75 of pole 76 will beneficially be dimensioned to present a surface area in contact with the barrier that is equal to the surface area of pole 77. Dimension 80 represents the coupling arm pole linking thickness and increasing this dimension reduces the arm reluctance. Dimension 78 represents the stand off distance of the coupling arm from the barrier and should be minimised while allowing for the length of the coil 72.

Coupling arm radius 79, coupling pole 76 diameter 75, arm standoff 78, arm depth 80, core relative permeability and core cross sectional area should be designed following equation 1 to ensure the magnetic reluctance of the secondary coupling arm is less than 100 times greater than the reluctance of the barrier leakage path. The requirement for alignment of both poles either side of the barrier will typically result in the two coupling arm assemblies being constructed of similar dimensions. The most significant difference between primary and secondary couplers will be the number of turns required in the coils. The turn ratio between primary and secondary coils may be optimised to achieve a desired transformer ratio.

The relative magnetic permeability of the primary coupling core must be greater than 100 to ensure efficient generation of magnetic flux.

Figure 4:
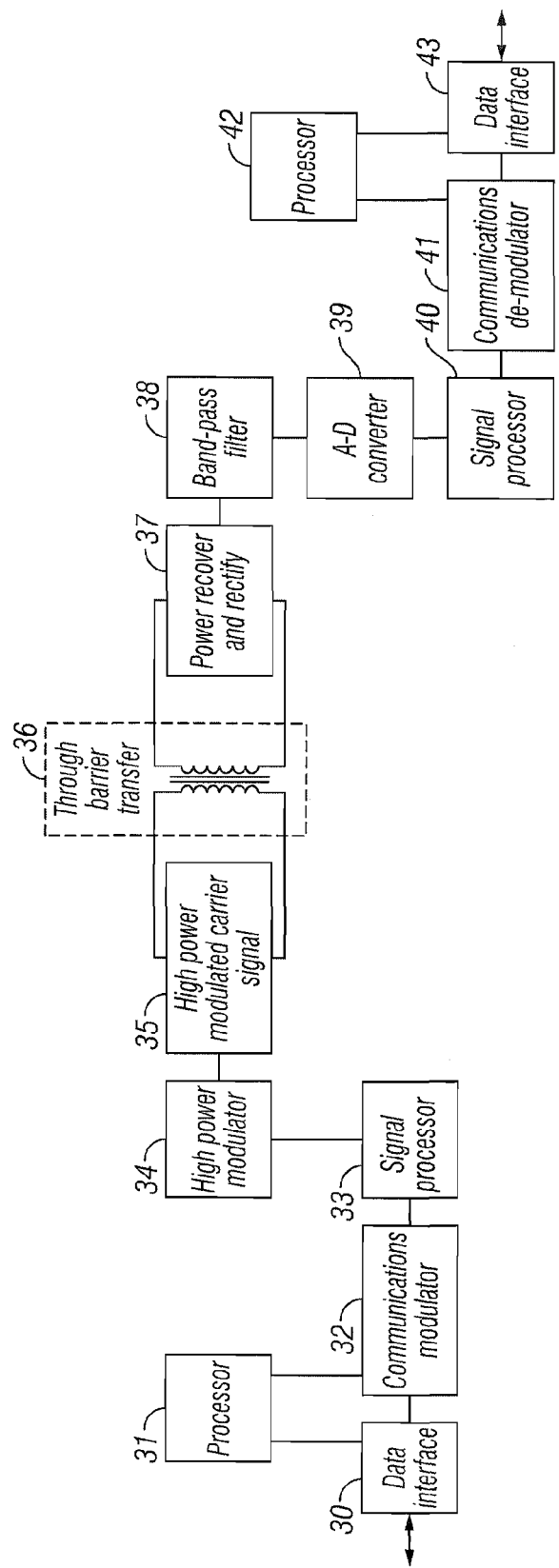
FIG. 4 illustrates a block diagram of a system designed to transfer electrical power and communicate data incorporating the transducer system of FIGS. 1, 2 and 3.

FIG. 4 shows a block diagram of an example system designed to transfer electrical power and communicate data incorporating the coupling transducer system of FIGS. 1, 2 and 3. Digital data is supplied to the system through data interface component 30. Processor 31 deals with communications tasks such as framing, addressing, error correction etc. Communications modulator 32 takes the packaged digital data and represents the digits as a modulated waveform.

Signal processor 33 further conditions the modulated signal and high power modulator 34 drives a modulated carrier signal 35. The through barrier transfer apparatus pair 36 passes the modulated carrier through the metal barrier and is described in detail in FIGS. 1, 2 and 3. 36 represents the primary coupling transducer, barrier and secondary coupling transducer described in this application.

Module 37 recovers electrical power from the modulated carrier and implements a non-linear mixing function to separate the communications modulated signal from the high power carrier. Band pass filter 38 further isolates the baseband modulated signal, which is digitised by the Analogue to Digital (A-D) converter 39. Signal processor 40 conditions the signal and communications de-modulator 41 converts the modulated signal back to received digital data. The data payload is separated from the header and transmission protocol elements by the processor 42 and passed to the external data interface 43. All the functions of this system description will be familiar to an engineer skilled in digital communications techniques.

Figure 5:
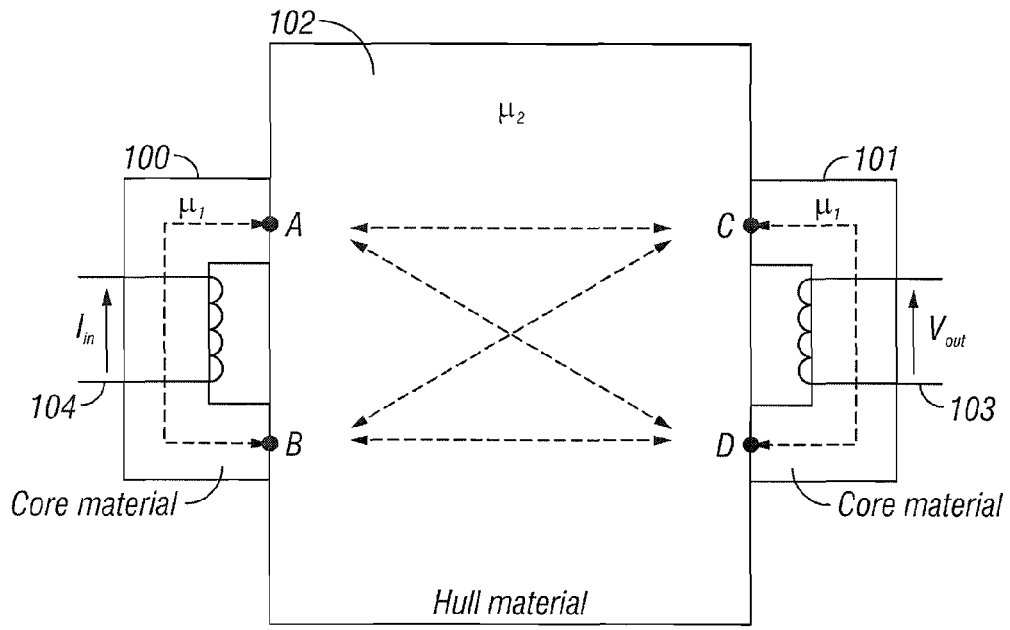
FIG. 5 shows the physical magnetic circuit paths available within the coupling system.

FIG. 5 shows the physical magnetic circuit paths available within the coupling system. Magnetic flux is generated by the primary coil 104 in coupling arm 100 and flows between points A and B within the primary coupling arm. 102 is the barrier material. The aim of the system is to stimulate flow of flux in the secondary coupling arm 101 flowing between C and D through barrier 102 so generating a potential across the secondary coil 103. The desired flux path for coupling from primary to secondary is generation in the primary B-A coupled directly from A to C through the barrier material, from C-D through the secondary coupling core returning through the barrier from D-B and the opposite path in the other half of the alternating cycle. Alternative leakage flux circuit paths exist within the barrier directly from A to B, A to D and D to A. Flux leakage through these alternative paths must be minimised by the coupling transducer system design parameters as described here.

Figure 6:
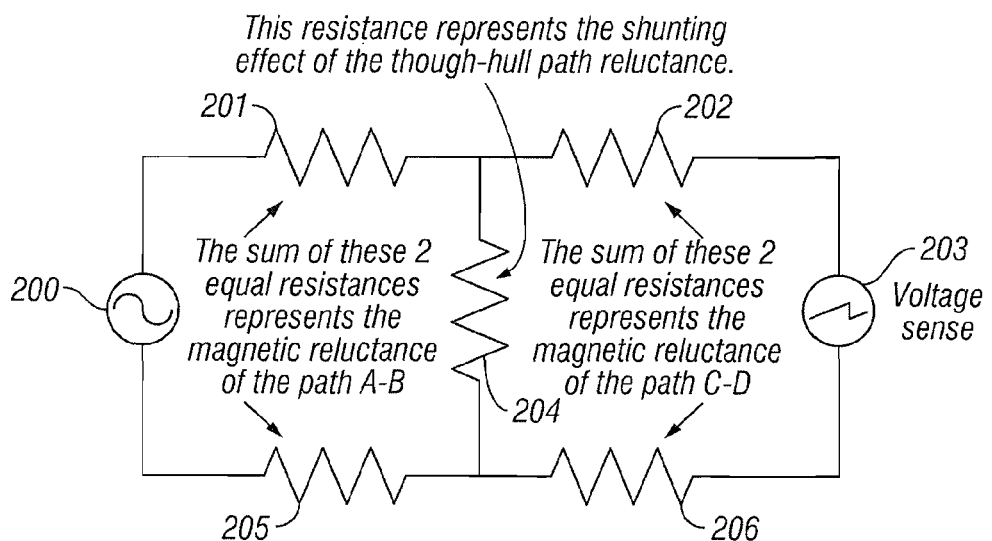
FIG. 6 shows an electrical circuit analogy of the magnetic circuit.

FIG. 6 shows an electrical circuit analogy of the magnetic circuit. Magneto motive force 200 is provided by the primary coil. The sum of the two resistors 201 and 205 represents the magnetic reluctance of the path A-B. Resistance 204 represents the shunting effect of the through hull path reluctance. The sum of resistors 202 and 206 represents the magnetic reluctance of the path C-D. Voltage 203 represents the voltage developed across the secondary coil.

Figure 7:
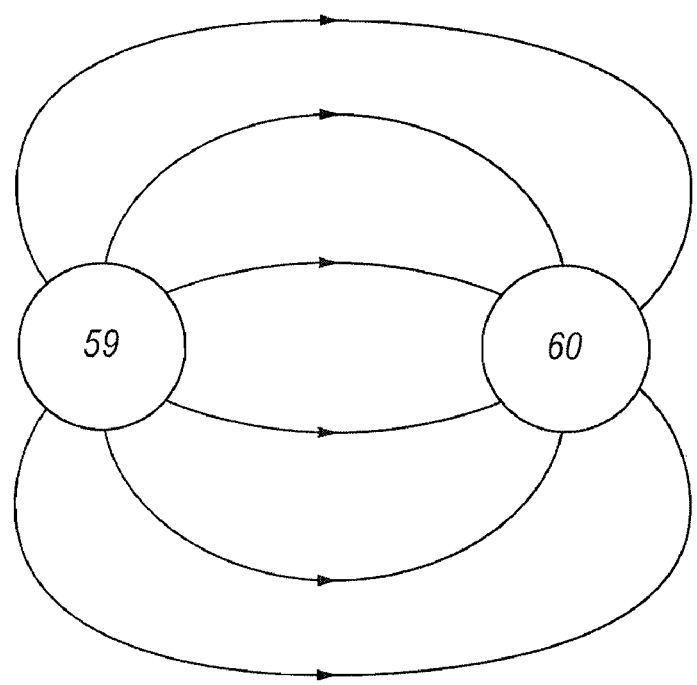
FIG. 7 shows the spreading of magnetic flux leakage lines in the x-y plane at the interface between coupling arm poles and conductive barrier.

FIG. 7 illustrates the x-y plane flux spreading effect that creates a large effective cross sectional area of the alternative flux path 56 across the metal barrier. This figure shows the magnetic field lines in the X-Y plane at the interface between coupling arm poles 59 and 60 and the conductive barrier. The coupling cores represent a geometrically longer path and smaller cross sectional area than the alternative unwanted path through the barrier. Magnetic reluctance of the through hull leakage path is increased by this spreading effect since reluctance inversely proportional to the cross sectional area as shown in equation 1. The coupling core permeability must be large enough to ensure the magnetic reluctance of the coupling core path is sufficiently low compared with the unwanted barrier flux leakage path to achieve signal coupling between primary and secondary. This is achieved by selection of the coupling core's material properties, dimensions and operational frequency.

Figure 8:
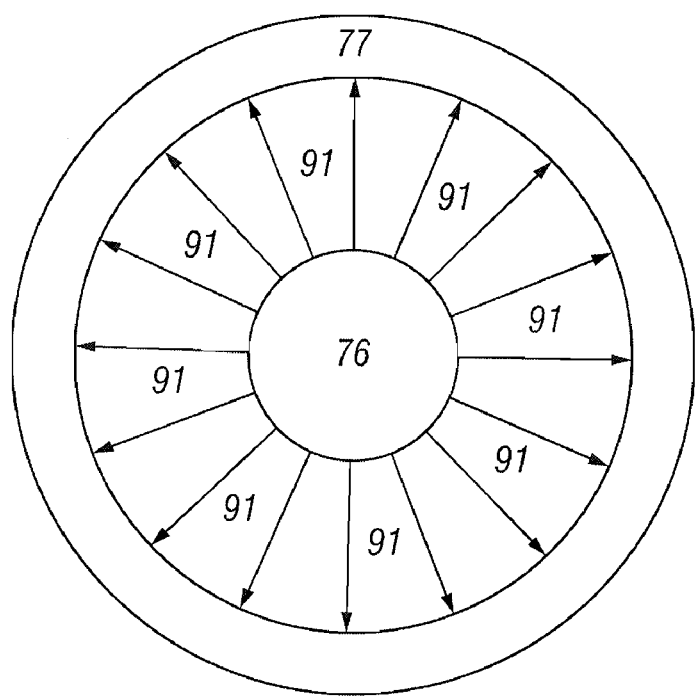
FIG. 8 shows the constrained leakage path within the alternative co-axial coupling design.

FIG. 8 shows the constrained flux leakage path within the alternative co-axial coupling design. The drawing shows a cross section through the coupling face when in contact with the barrier material. 76 represents the centre pole of the coupling transducer and 77 the outer pole of the coupling transducer where lines 91 represent the flow of undesired magnetic leakage flux flowing between the two poles of the primary coupling transducer in the x-y plane of the barrier instead of through the barrier across the z-axis to the secondary as intended. This leakage path has a cross sectional area constrained by the geometry of this co-axial coupling transducer design and does not experience the cross sectional area spreading seen in FIG. 7. For this reason the shunting leakage magnetic reluctance in this co-axial coupling transducer design is less than that seen in the U-shaped design and the coupler is consequentially more efficient.

Initial relative permeability of ferrous barrier materials typically decreases with increasing frequency. In one specific implementation of the present invention the carrier frequency used will be targeted at 100 kHz. Here the permeability of the barrier steel will be reduced while the coupling core material can be selected for high permeability at these frequencies. This approach helps to increase the flux flowing through the secondary coil.

For example, in 1018 low-carbon steel plate magnetic relaxation is observed above approximately 5 kHz. While relative permeability of 1080 steel is around 280 at 10 Hz this falls to 90 at 100 kHz. In contrast, high permeability Manganese-Zinc ferrite material maintains a relative magnetic permeability of 5,000 up to 300 kHz. In one example implementation, Manganese-Zinc ferrite is used for the primary and secondary coupling cores of the coupling transducers using a carrier frequency of 150 kHz to maximise magnetic flux coupled to the secondary coil.

By way of illustration, a 100 kHz carrier signal could be modulated with a Quadrature Phase Shift Keyed (QPSK) signal at a symbol rate of 50 kHz to implement a 100 kbps communications link. Other standard forms of digital modulation scheme will be equally applicable to this disclosure with appropriate signal processing well known in the communications field.

Efficiency of the communications system will be affected by alignment of the devices on either side of the barrier and this represents a potential challenge during installation. Missalignment between primary and secondary core contact points increases the through barrier flux coupling path length so increasing the magnetic reluctance of this path and reducing transfer efficiency. An installation method is described here to address this issue. The primary coupling transducer is installed on one side of the barrier and a signal applied to the primary coil. The secondary transducer is then moved around the X-Y plane on the other side of the barrier while recording received signal strength against X-Y co-ordinates relative to a marked reference point. In this way signal strength can be mapped against position and the optimal installation position determined. For the U-shaped coupling core design the secondary coupling arm will be rotated at each survey position to determine the optimum rotational alignment with respect to the unseen primary. This represents a laborious installation process, which is greatly simplified by the co-axial design of FIG. 3, which operates independently of rotational alignment.

Where the coupling cores contact with the barrier material, relative surface roughness and planarity of the coupling surfaces will create a small gap between coupling core material and barrier. The composition of this gap material will determine its magnetic reluctance and this should be minimised to improve coupling efficiency. Without the features described here, this gap may be filled with the surrounding material such as air or water. To minimise this effect the core surfaces should be planar with each other and polished to reduce surface roughness. If the barrier can be prepared the contact area should also be polished. In some cases it will be acceptable to bond the coupling core to the barrier material. An epoxy adhesive ferrite may be loaded with ferrite powder to increase the magnetic permeability of this bonding layer. The pole surfaces could alternatively be fitted with pliable high relative magnetic permeability, greater than 10, material that can conform to the barrier surface planarity and roughness. For example, a putty material manufactured from flexible polymer can be loaded with ferrite powder for this purpose. Alternatively ferrite power could be packed inside a flexible membrane for positioning between the poles and the barrier.

The coupling transducer designs described here will be particularly beneficial where the barrier has an initial relative permeability greater than 10. Preferably, the coupling core material has low electrical conductivity to minimise residual currents that lead to energy losses in the material. Electrical conductivity of the core material must be less than 10 mS/m.

A direct current component may be applied to the primary or secondary coupling coils to clamp the core to the hull for temporary attachment. This method also aids final alignment of the inner and outer components since the final mating approach of the second coil will be partially guided by magnetic attraction.

The disclosed design will be particularly advantageous for use with a ferrous metal submarine hull where other alternative methods may be severely limited or fail. One application may be in establishing temporary communications for submarine rescue operations or mobile communications for divers outside the pressure hull.

A skilled person will appreciate that variations of the disclosed arrangements are possible without departing from the invention. Although the specific implementations are described separately, it will be appreciated that there are many alternative configurations. For example, while a simplex communications system is described, the process can be reversed to allow two-way communications using any of the well know multiplexing communications techniques e.g. frequency division, time division etc. for implementing bi-directional communications. Also, while the design of the described system is optimised for operation through high permeability barriers a similar system will be effective through low permeability barriers. Accordingly the above description of the specific embodiment is made by way of example only and not for the purposes of limitation. It will be clear to the skilled person that minor modifications may be made without significant changes to the operation described.

The invention claimed is:

1. A data communication system for passing data signals through a barrier, comprising a magnetic flux coupling transducer system having a primary coil and primary coupling core and a secondary coil and secondary coupling core, the transducer system being arranged to pass communication signals and electrical power from one side of the barrier to receiving equipment on the other side and wherein the secondary core magnetic permeability is greater than that of the barrier material at the frequency of operation.

2. A data communication system as claimed in claim 1 wherein the communications signal comprises a carrier signal that is modulated to represent data.

3. A data communication system as claimed in claim 2 wherein the signal received in the secondary coil is de-modulated to recover transmitted data.

4. A data communication system as claimed in claim 1 wherein the secondary core magnetic permeability is two or more times greater than that of the barrier material at the frequency of operation.

5. A data communication system as claimed in claim 1, wherein the coupling core material has a bulk electrical conductivity of less than 10 mS/m.

6. A data communication system as claimed in claim 1 comprising means for implementing unidirectional communications and electrical power transfer.

7. A data communication system as claimed in claim 1 comprising means for implementing a bidirectional communications and electrical power transfer.

8. A data communication system as claimed in claim 1 wherein the coupling core is bonded in contact with the barrier.

9. A data communication system as claimed in claim 1 wherein a flexible material with relative magnetic permeability greater than 10 is placed between the first and/or second coupling core surfaces and the barrier.

10. A data communication system as claimed in claim 1 wherein a flexible polymer loaded with ferrite powder to achieve a bulk relative magnetic permeability greater than 10 is placed between the first and/or second coupling core surfaces and the barrier.

11. A data communication system as claimed in claim 1 wherein a powder material with relative magnetic permeability greater than 10 is enclosed by a flexible membrane and placed between the first and/or second coupling core surfaces and the barrier.

12. A data communication system as claimed in claim 1 comprising means for applying a direct current component to the primary and/or secondary coil to clamp the primary and/or secondary coupling core to the barrier.

13. A data communication system as claimed in claim 2, wherein the carrier frequency is greater than 10 kHz.

14. A data communication system as claimed in claim 1 wherein the coupling poles are separated in the X-Y plane by a distance greater than or equal to the barrier thickness.

15. A data communication system as claimed in claim 1 wherein a signal carrying waveform and a power carrying waveform are transmitted simultaneously and one or more frequency dependent filters are provided to prevent the power carrying waveform from impinging on receiver circuitry for the signal carrying waveform.

16. A data communication system as claimed in claim 1 further comprising transmit circuitry that includes a modulator and receive circuitry that includes a demodulator.

17. A data communication system as claimed in claim 1 wherein the frequency of operation is selected to enhance the ratio of magnetic reluctance of the through barrier leakage path divided by the magnetic reluctance of the secondary coupling core.

18. A data communication system as claimed in claim 1 wherein the first and/or second coupling core material has an electrical conductivity of less than 10 mS/m.

19. An installation method for a data communication system as claimed in claim 1 wherein alignment of the secondary coupling core and coil relative to the primary coupling core and coil is based on signal strength.

20. An installation method for a data communication system as claimed in claim 19 wherein alignment of a secondary U-shaped transducer relative to a primary U-shaped transducer is based on signal strength mapped against X-Y position and relative rotation.

21. A structure or vehicle or barrier fitted with a data communication system as claimed in claim 1.

* * * * *